(12) United States Patent
Stobie et al.

(10) Patent No.: US 7,043,400 B2
(45) Date of Patent: May 9, 2006

(54) TESTING USING POLICY-BASED PROCESSING OF TEST RESULTS

(75) Inventors: Keith B. Stobie, Bellevue, WA (US); Sujay Sahni, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/705,005

(22) Filed: Nov. 10, 2003

(65) Prior Publication Data

US 2005/0110806 A1 May 26, 2005

(51) Int. Cl.
*G06F 11/30* (2006.01)
*G06G 11/00* (2006.01)

(52) U.S. Cl. .......................... 702/183; 714/25; 714/37

(58) Field of Classification Search ................ 702/183, 702/122, 123; 714/25, 37, 38
See application file for complete search history.

(56) References Cited

U.S. PATENT DOCUMENTS

| | | | |
|---|---|---|---|
| 5,594,892 A | | 1/1997 | Bonne et al. |
| 6,370,661 B1 * | | 4/2002 | Miner .......................... 714/718 |
| 6,434,488 B1 | | 8/2002 | Robson |
| 6,546,506 B1 | | 4/2003 | Lewis |
| 6,601,018 B1 | | 7/2003 | Logan |
| 2001/0028359 A1 * | | 10/2001 | Muraishi et al. ............ 345/700 |
| 2003/0097650 A1 | | 5/2003 | Bahrs et al. |
| 2004/0181724 A1 * | | 9/2004 | McBride ...................... 714/735 |

OTHER PUBLICATIONS

"Taking the Drudge out of Test Development," TET ware White Paper, available at <http://tetworks.opengroup.org/Wpapers/drudge.htm>, accessed on Feb. 4, 2004, 3 pages.
Keith Zambelich, "Totally Data-Driven Automated Testing," copyright 1998, available at <http://www.sqa-test.com/w_paperl.html>, accessed on Mar. 14, 2004, 14 pages.
Daniel Mosley and Bruce Posey, "Just Enough Software Test Automation," Prentice Hall PTR, Upper Saddle River, New Jersey, 2002, pp. 1-260.
International Standard ISO/IEC 13210, IEEE Std 2003, Information technology—Requirements and Guidelines for Test Methods Specifications and Test Method Implementations for Measuring Conformance to POSIX Standards, pp. 1-86.
Rob Savoye, "DejaGnu: The GNU Testing Framework," available at <http://ww.gnu.org/software/dejagnu/manual/>, accessed on Mar. 14, 2004, 87 pages.

* cited by examiner

*Primary Examiner*—Bryan Bui
*Assistant Examiner*—Meagan S Walling
(74) *Attorney, Agent, or Firm*—Lee & Hayes, PLLC

(57) ABSTRACT

A testing technique and apparatus are described for apply a test to a System Under Test (SUT) in one or more configurations of the SUT. The test can generate and store multiple output results that capture the behavior of the SUT in performing the test. Policy analysis logic applies a policy to the output results to generate an output verdict that reaches some conclusion regarding the outcome of the test. That is, the applied policy maps a subset of stored output results (and possibly input parameters) into the output verdict based on specified rules. A tester can apply different policies to investigate different aspects of the SUT's behavior.

10 Claims, 5 Drawing Sheets

US 7,043,400 B2

TESTING USING POLICY-BASED PROCESSING OF TEST RESULTS

TECHNICAL FIELD

This subject matter relates to the testing of a system, and, in a more particular implementation, to the testing of a system using automated data processing techniques.

BACKGROUND

A number of techniques exist in the art for testing systems, such as computer systems running machine executable code. By way of overview, a general class of these techniques operates by applying a predefined test to a System Under Test (SUT), generating a singular output result, and then comparing this singular output result with a singular expected result. The tester may designate an output result as anomalous if it diverges from an expected result by more than a predefined amount. In data driven testing, a tester may repeat a test operation for a range of input values to produce a corresponding range of output results. These output results are then pair-wise compared with associated expected results.

In one case, a tester may specifically configure a test to examine the functionality of the SUT. A functional test determines whether the SUT is generating an expected result (that is, whether it performs correctly or not). In another case, a tester may configure a test to examine the performance of the SUT. A performance-based test determines whether the SUT is running in a desired manner (that is, whether it is running quickly enough, utilizing proper amounts of memory or file space during execution, and so forth).

FIG. 1 depicts the above-described known testing strategy. In this figure, testing logic 102 applies a predefined test to a SUT 104. This operation generates an actual output result 106. Comparison logic 108 compares the actual output result 106 with an expected result 110 to generate a test outcome 112.

The above-described testing strategy often fails to adequately meet the challenges presented in today's technical environments. For instance, a tester will often need to sequence through a great number of tests to ensure that different functional and performance-related aspects of the SUT 104 are working properly. This requires tedious and time-consuming retooling of the testing logic 102 to sequentially apply the series of tests to the SUT 104. For example, some contemporary software-driven systems can provide different user interface (UI) presentations in a number of different natural languages. A thorough testing regimen therefore needs to test the same SUT 104 in different configurations associated with different languages. Again, this requires the burdensome task of devising different tests to run on the testing logic 102, applying these tests to the SUT 104 in different respective configurations, producing a series of corresponding actual results 106, and efficiently managing the myriad of results 106.

Further, the above-described testing strategy does not readily allow a tester to revise a testing strategy after a test has been run. For example, a tester may be required to perform a battery of tests in a fixed time schedule to meet an anticipated product release date. Each test may require a defined setup time and execution time. After performing a series of tests, the tester may discover that certain assumptions made during prior tests were not optimally suited to produce results that are needed. In this case, the tester must completely repeat the test, requiring a potential delay in the overall testing regimen.

Other types of testing strategies provide output results that convey more information than simply an indication of "Pass" and "Fail." For instance, so-called multiple-outcome testing classifies a failed test as either "test known" or "test unknown." Such a test will generate a "test known" state when it is able to ascertain the cause of failure; it will generate a "test unknown" state otherwise. However, this strategy does not solve the above-described problems, as it still requires a tester to sequence through multiple separate tests to fully explore the behavior of a SUT, and potentially completely repeat a test if prior testing assumptions were later determined to be inadequate.

There are additional drawbacks to the conventional strategies described above.

As such, there is an exemplary need in the art for a more efficient technique for testing systems, such as, but not limited to, software-driven computing systems.

SUMMARY

In one exemplary implementation, a method is described for testing a target system. The method includes the steps of: (a) identifying a test to perform on the target system in at least one configuration of the target system; (b) applying the test to the target system and collecting plural actual results that characterize the operation of the target system in performing the test; and (c) applying a policy to the actual results to generate an output verdict, wherein the policy maps a subset of the actual results to the output verdict using a selected mapping paradigm.

A related apparatus and computer readable media are also described herein.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

A. System for Testing a SUT

Figure 2:
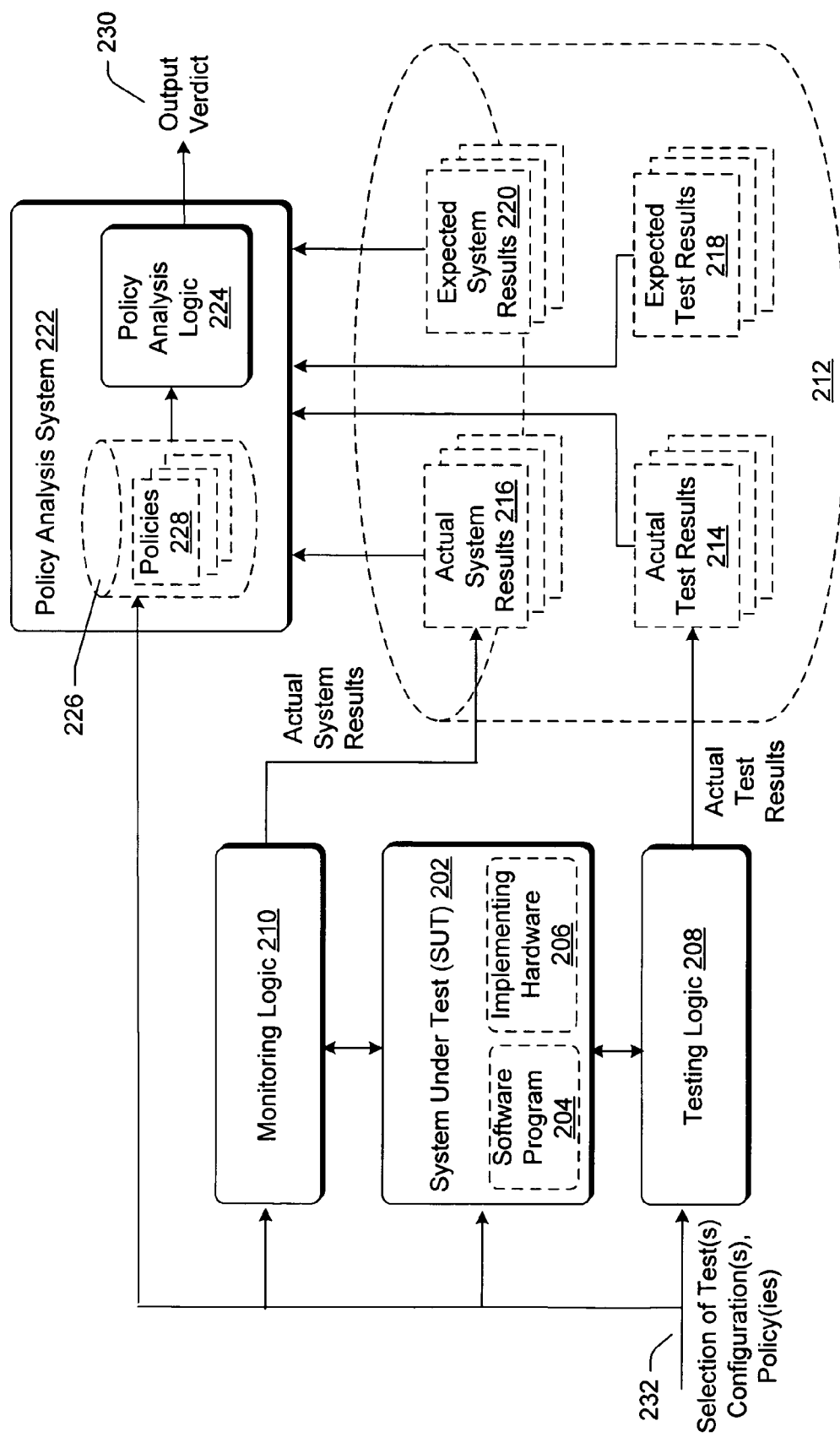
FIG. 2 shows an exemplary policy-based testing environment for testing a SUT that draws from a database of output results and expected results.

FIG. 2 shows a testing environment 200 for testing a system under test (SUT) 202. The term "system" should be construed broadly as used herein. A system can pertain to a component within an apparatus, an apparatus as a whole, a collection of apparatuses coupled together via a network, and so forth. The SUT 202 might include machine readable instructions (e.g., software) which perform prescribed functions when implemented on a processing device (e.g., a computer processing unit of a computer), or may include hardwired circuitry for performing fixed functions, or may include some combination of software and hardwired circuitry. The SUT 202 may include structure for performing functions in the analog domain, digital domain, or some combination thereof. Hence, the SUT 202 shown in FIG. 2 represents a general container that may include one module or a collection of interrelated modules forming a system.

In an exemplary context most commonly evoked in this disclosure, the SUT 202 represents some kind of computer device (e.g., personal computer, server, mainframe, etc.) running a software program 204 on the system's hardware 206. The software program 204 can include any kind of code expressed in any kind of programming language, and/or may include a collection of declarative statements expressed in a markup language, such as the extensible markup language (XML). The hardware 206 can include one or more CPUs, buses, memory, various interfaces, and so forth. In this exemplary environment, the objective of the testing technique is to test the functionality and/or performance of the software program 204. A functional test attempts to verify whether the software program 204 is producing correct results. A performance-based test attempts to verify whether the software program 204 meets certain performance-related expectations, such as certain expected speed of execution requirements or expected memory utilization requirements. To repeat, however, the testing scenario shown in FIG. 2 is exemplary and not limitative of the full range of testing environments that the principles described here can be applied to. For instance, the testing techniques described here can be applied to a system constituted entirely of fixed (i.e., non-programmable) hardware components.

Testing logic 208 is provided to perform tests on the SUT 202. More specifically, the testing logic 208 can implement a great variety of testing functions depending on the type of equipment or software being tested in the SUT 202, and depending on the objectives of the tester. In one implementation, the testing logic 208 can automatically drive the software program 204 of the SUT 202 to simulate actions that a user might take when manually interacting with the SUT 202. This might specifically entail automatically calling up user interface (UI) displays, entering keystrokes or mouse actions, feeding collections of analog or digital signals into the SUT 202, storing output results, and so on. For example, in software products running on Microsoft's Windows ® operating system (produced by Microsoft Corporation of Redmond, Wash.), this kind of simulation can be achieved by interacting with the software program 204 under test via the Win32 ® API and/or the Active Accessibility ® interfaces, or some other mechanism. It will be appreciated that the above-described testing strategies are merely a small subset of possible functionality that can be implemented using the testing logic 208.

In addition, the testing environment 200 can include monitoring logic 210 for monitoring the performance of the SUT 202 as it is being tested by the testing logic 208. More specifically, the monitoring logic 210 can make a variety of measurements as the SUT 202 is being tested by the testing logic 208. Exemplary measurements may include the time required to process certain tasks in the SUT 202, the memory or file utilization of the software program 204 under test, or any other behavior of the SUT 202. (Generally, the term "performance" has broad connotation as used herein; it can refer to the behavior of the SUT 202 or any characteristic of the SUT 202 pertinent to its behavior.) In many cases, the monitoring logic 210 collects information that is supplemental to the primary results generated by the testing logic 208. The monitoring logic 210 can sample information at predetermined locations within the SUT 202, e.g., by tapping into messages being transmitted over wires or information being transmitted between program modules, and so on.

For instance, the testing logic 208 may be configured to activate a calculator function implemented on a personal computer device (e.g., thereby activating a common UI presentation of a calculator on the computer device's graphical user interface). In this example, the code that implements the calculator constitutes the software program 204 under test. The test may consist of automatically manipulating the displayed calculator to perform a variety of arithmetic functions and then store the numeric results. In the terminology used herein, such output constitutes so-called "actual test results." On the other hand, the monitoring logic 210 can monitor the performance of the SUT 202 as it implements the software program 204 under test. As mentioned, the monitoring logic 210 might measure the time required to perform various tasks in the SUT 202 as it executes the calculator program, or its memory utilization during execution, or some other system-related parameter. In the terminology used herein, such measurements constitute so-called "actual system results." The actual system results supplement the actual test results by providing supplemental information that can be used, if needed, to verify whether the SUT 202 is performing in a desired manner.

In one example, commercial "off the shelf" testing programs can be used to implement the testing logic 208. The programs generate predefined output that serves as a primary indicator of the success or failure of the feature being testing. The monitoring logic 210 can be a program or equipment that is "overlaid" on top of the commercial testing program, collecting supplemental performance-related information during the course of the test and/or after the test.

According to the testing strategy described herein, the testing logic 208 can be programmed to test the SUT 202 in a number of different configurations. For instance, consider the example of the calculator program. This program may perform its calculations in scientific mode or standard mode. Or the program may interact with the user in a number of different natural languages, each one corresponding to a different configuration. A single test performed in the testing environment 200 can therefore be conceptualized as potentially including a number of parts or stages corresponding to different configurations to be tested.

A data store 212 can store the actual test results 214 generated by the testing logic 208 and the actual system results 216 generated by the monitoring logic 210. This data store 212 can also store a collection of expected test results 218. The expected test results 218 correspond to expected results that should be generated by the testing logic 208 if the SUT 202 is operating in a prescribed manner (such as a desired or correct manner). In the calculator program example, the expected test results 218 may consist of a collection of numerical results that should be output by the testing logic 208 if the calculator software program is operating in an error-free manner. The data store 212 also stores a collection of expected system results 220. The expected system results 220 correspond to expected results that should be generated by the monitoring logic 210 if the SUT 202 is operating in a prescribed manner. For example, the expected system results 220 might specify a range of CPU execution times that are considered normal spans of time to perform certain program tasks. The expected results 218, 220 can be collected in advance based on a previous running of the test under controlled conditions (e.g., ideal or error-free conditions). Alternatively, the expected results 218, 220 can be obtained from standard reference sources, such as standard lookup tables, etc.

A so-called policy analysis system 222 generally houses the functionality that analyzes the information stored in data store 212. More specifically, the policy analysis system 222 includes policy analysis logic 224 that governs the behavior of the policy analysis system 222. The policy analysis system 222 also can include a policy analysis data store 226 that stores a collection of policy definitions 228 (referred to herein for brevity as "policies"). By way of overview, the policies 228 specify the rules used to map information stored in the data store 212 into an output verdict 230. The output verdict 230 provides information regarding the outcome of the test, such as whether the SUT 202 is performing in a normal or sub-optimal manner.

The various components shown in FIG. 2 are illustrated as separate modules to facilitate discussion. However, these components can be grouped together in various ways depending on the testing environment. For instance, in one implementation, the testing logic 208 can be implemented as a separate module (e.g., a separate computer) from the SUT 202 (which itself may be implemented as a computer). In another case, the testing logic 208 may be implemented as a module within the SUT 202, such as a computer program running on the SUT 202. The same is true with the other components shown in FIG. 2, such as the monitoring logic 210, data store 212, and policy analysis system 222; these components can be implemented as separate modules from the SUT 202, or can be implemented by the SUT 202 itself. In the case where these components represent separate modules, they can be coupled together in various ways, such as by discrete point-to-point hardwired and/or wireless links, network coupling (LAN, Ethernet, intranet, Internet, etc.), or other coupling technique.

The testing logic 208, monitoring logic 210, and policy analysis system 222 can be implemented as machine readable code running on a processing device, by hardwired circuitry, or by a combination of software and hardwired circuitry. The data store 212 can represent a central repository of information, or separate (e.g., distributed) repositories of information.

The operation of the policy analysis system 222 will be described in detail below in the discussion of FIG. 4. However, by way of overview here, the data store 212 can store a relatively large collection of information gleaned from the SUT 202 during a particular test. More specifically, a single test might entail executing one or more testing operations on the SUT 202 for one or more configurations. As mentioned, the collected results can include a variety of information regarding the actual results 214 of the test and a variety of information regarding actual system results 216. The data store 212 also correlates these actual results (214, 216) with expected results (218, 220). The policy analysis system 222 operates by applying a policy stored in the policy data store 226 to the information in the results data store 212. This policy provides rules that specify what information should be extracted from the data store 212 for use in generating the output verdict 230. Such rules also specify the kinds of mapping transformations that are to be applied to extracted information in order to generate the output verdict 230.

For example, in one case, a policy might specify that the analysis system 222 is to compare the actual test results 214 with the expected test results 218 and generate the output verdict 230 based on this comparison. In another case, a policy might specify that the analysis system 222 should generate the output verdict 230 based only on a comparison of the actual system results 216 and the expected system results 220. Still another policy might specify that the analysis system 222 should generate the output verdict 230 based on a combination of both the actual test results 214 and the actual system results 216. Other policies can include rules that generate the output verdict 230 based, in part, on parameters used to set up the test (such as a parameter that specifies the speed at which the CPU is driven in performing the test).

Thus, in general, a policy can extract information from a large collection of input data sources and can apply a wide variety of transformations to this extracted information. More complex rules can weight input information by various weighting factors, determine trends in the input information over a span of collected results, perform any mathematical operation on the input information, and so on. Other possible policies might invoke artificial intelligence engines, neural network classifiers, or other analysis paradigms.

A tester can define the manner in which the policy analysis system 222 operates via an input 232. That is, via this input 232, the tester can select the kinds of tests that are to be applied to the SUT 202, the types of configurations to be invoked by the tests, and the type of policies to be applied to the results generated by the tests. The tests, configurations, and policies can be selected separately or en bloc (i.e., as a related or linked group of selections). The input 232 is shown as potentially feeding into the SUT 202, the testing logic 208, the monitoring logic 210, and the policy analysis system 222. The testing logic 208 uses such input 232 to define the type of test it is to apply to the SUT 202. The SUT 202 uses such input 232 to determine what configuration(s) it should load for the test. The monitoring logic 210 uses the input 232 to determine what system parameters it should measure for the test applied to the SUT 202. The policy analysis system 222 uses the input 232 to determine what policies to apply to the collected results stored in the data store 212.

Figure 1:
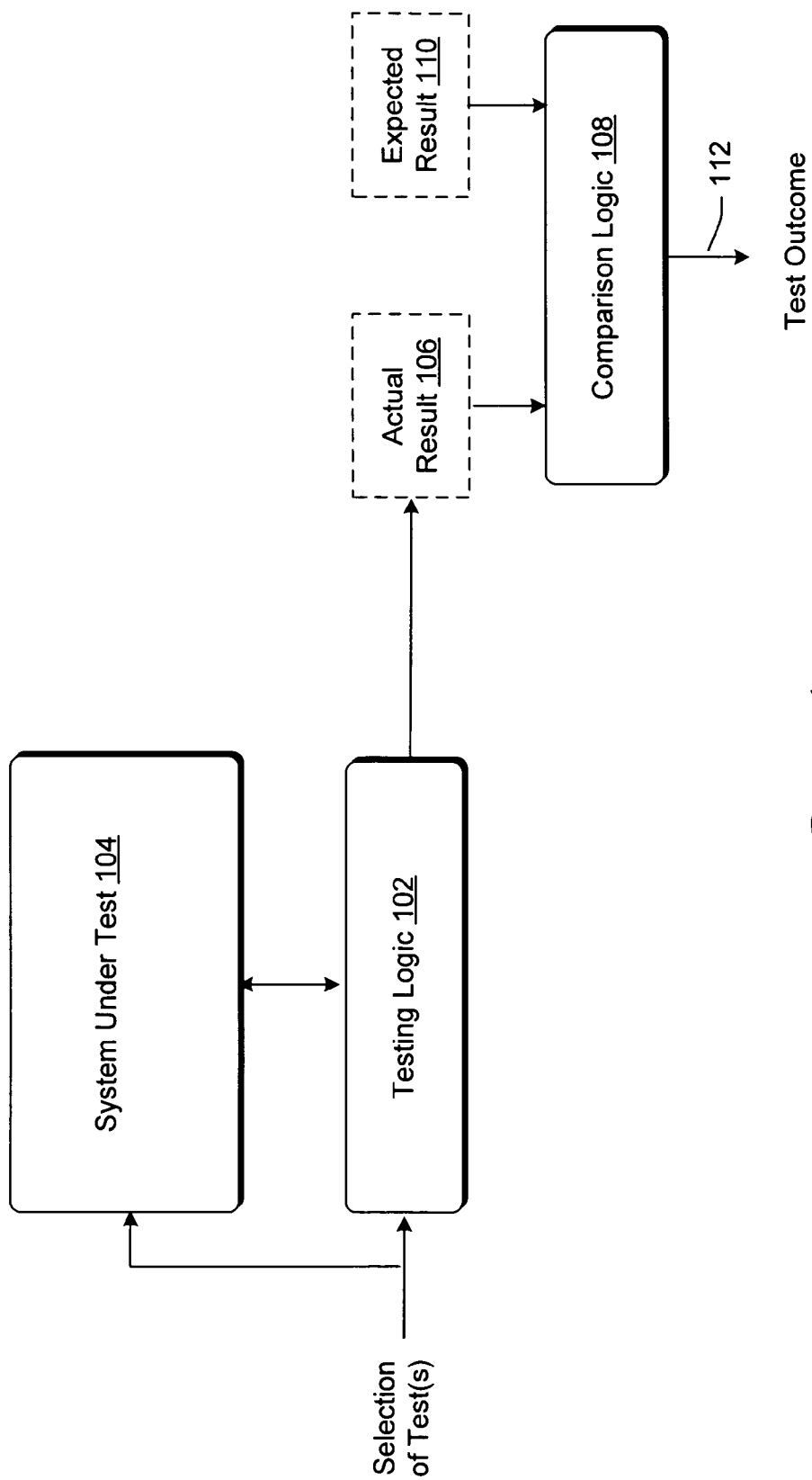
FIG. 1 depicts a known technique for testing a System Under Test (SUT).

The above-described strategy employed by the testing environment 200 has numerous advantages compared to the known testing strategy shown in FIG. 1. For instance, a tester can use the testing environment 200 to initially collect a relatively large amount of information that canvases many different functional and performance-related aspects of the SUT 202. Thereafter, the tester can apply different policies 228 to provide different outcome verdicts 230 to the same repository of information. For instance, the tester can apply a first battery of policies to investigate the functional-related behavior of the software program 204, and another battery of policies to investigate the performance-related behavior of the software program 204, all with respect to information stored in the data store 212 that has been collected in a single test. This is a better testing strategy than the technique referenced in FIG. 1, as it does not require the user to continually toggle between testing tasks and analysis tasks. Further, if at some later time the tester determines that prior analysis performed on the SUT was inadequate, the tester can perform additional analysis based on the information stored in the data store 212 by selecting additional policies to apply to this information. As a result of this approach, some of the information collected and stored in the data store 212 may never be used, as an individual tester may not have a need for it (depending on the tester's particular objectives in performing the test).

Figure 3:
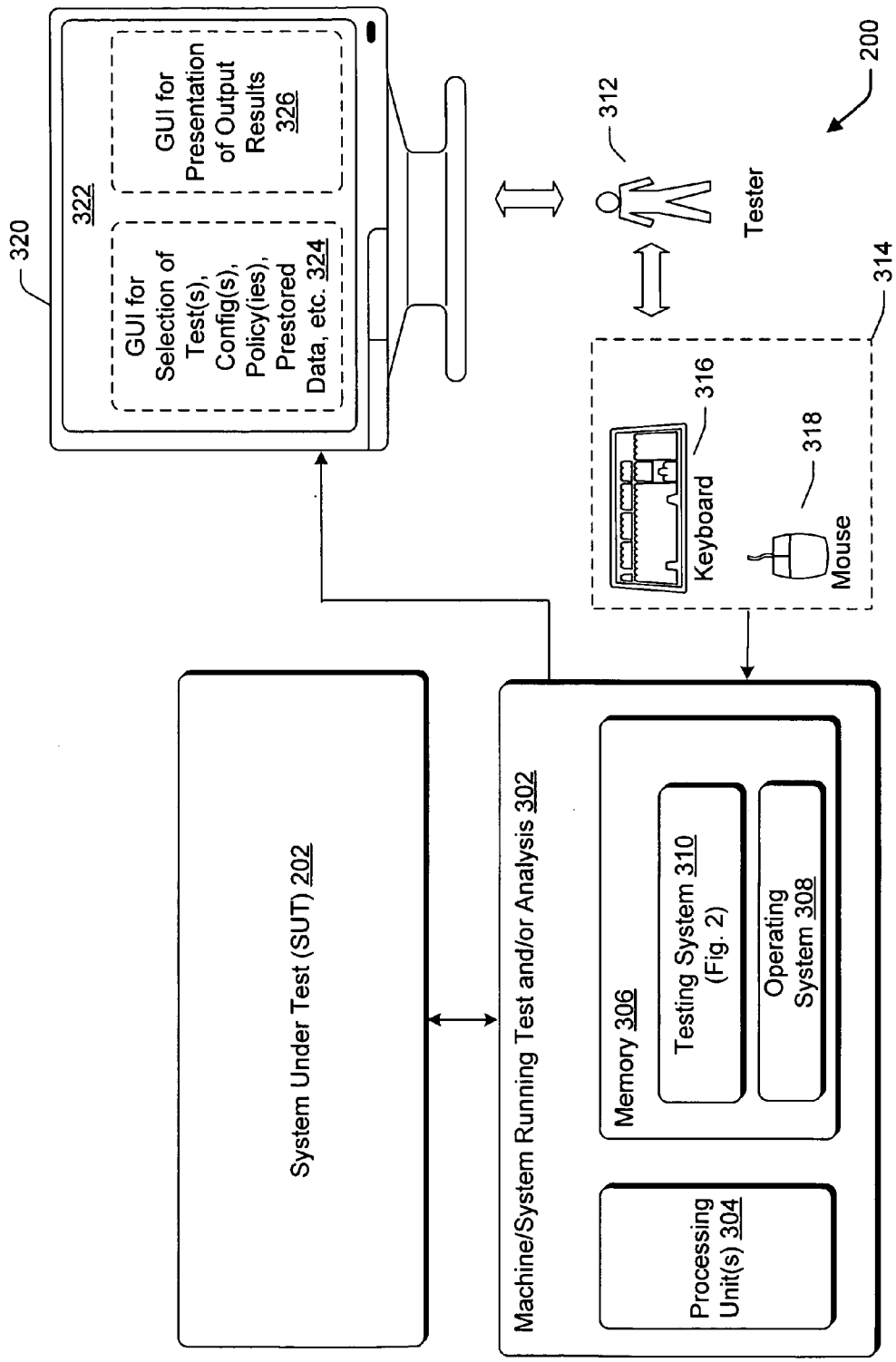
FIG. 3 shows another depiction of the policy-based testing environment shown in FIG. 2.

FIG. 3 shows how the logic illustrated in FIG. 2 can be implemented in a specific exemplary machine setup. In this figure, all of the testing functionality shown in FIG. 2 is implemented by testing machine 302. Such a machine 302 may comprise a personal computer, server-type computer, or other type of data processing apparatus. The machine 302 includes one or more processing units 304 (e.g., CPUs) coupled to memory 306. In the general depiction of FIG. 3, the memory 306 can include a collection of volatile and non-volatile memory media (e.g., RAM, ROM, disc storage, etc.). The memory 306 generally includes an operating system 308 for handling various base functions performed by the machine 302, and also includes testing system 310. The testing system 310 can generally encompass the functionality provided by the testing logic 208, monitoring logic 210, policy analysis system 222, and the data store 212. As depicted in FIG. 3, the testing system 310 is separate from the SUT 202. However, in other implementations, the testing system 310 can be implemented on the SUT 202 itself, e.g., as a program running on the SUT 202. Further, FIG. 3 shows an integrated testing system 310; however, in other embodiments, the separate logic and storage modules identified in FIG. 2 can be implemented as separate components coupled together via hardwired links, wireless links, network links, etc.

A tester 312 can interact with the machine 302 via a collection of input devices 314. The input devices 314 can include conventional devices such as a keyboard 316, mouse device 318, and so on.

The tester 312 can also interact with the machine 302 via display monitor 320. The machine 302 can present a graphical user interface (GUI) 322 on the display monitor 320 having a number of display fields. One display field 324 can provide a GUI that allows the tester 312 to select various tests, configurations, and policies. For instance, at the commencement of a test, the tester 312 can use display field 324 to define what test is to be performed, and what configurations will be tested. In one implementation, machine 302 can be set up to allow the user to select configurations separately from the basic test. In another case, the selection of a specific test may automatically trigger the execution of a number of different configurations associated with the test. Once the test has been performed, the tester 312 can use display field 324 to select what policies 228 should be performed on the collected information stored in the data store 212. A second display field 326 presents another GUI that presents the output of the analysis. The GUIs 324 and 326 may each comprise a series of interface pages, with a navigational mechanism linking the pages together using conventional GUI strategies.

The first and second display fields 324, 326 can present information in a variety of graphical formats. For instance, machine 302 can allow the tester 312 to select tests, configurations, and policies by clicking on hypertext links associated with labels denoting this information. The output of the analysis can be provided in table form, graphical form, or some other form. The machine 302 can also incorporate various help functionality that can assist the tester 312 in selecting appropriate tests, configurations, and policies, and in subsequently interpreting the output results.

Other types of display presentations can be used besides GUI's, such as a text presentation, etc. Further, the machine 302 can also forward output results to other devices, such as printers, other computers, etc.

B. Method of Operation of the Testing Techniques

Figure 4:
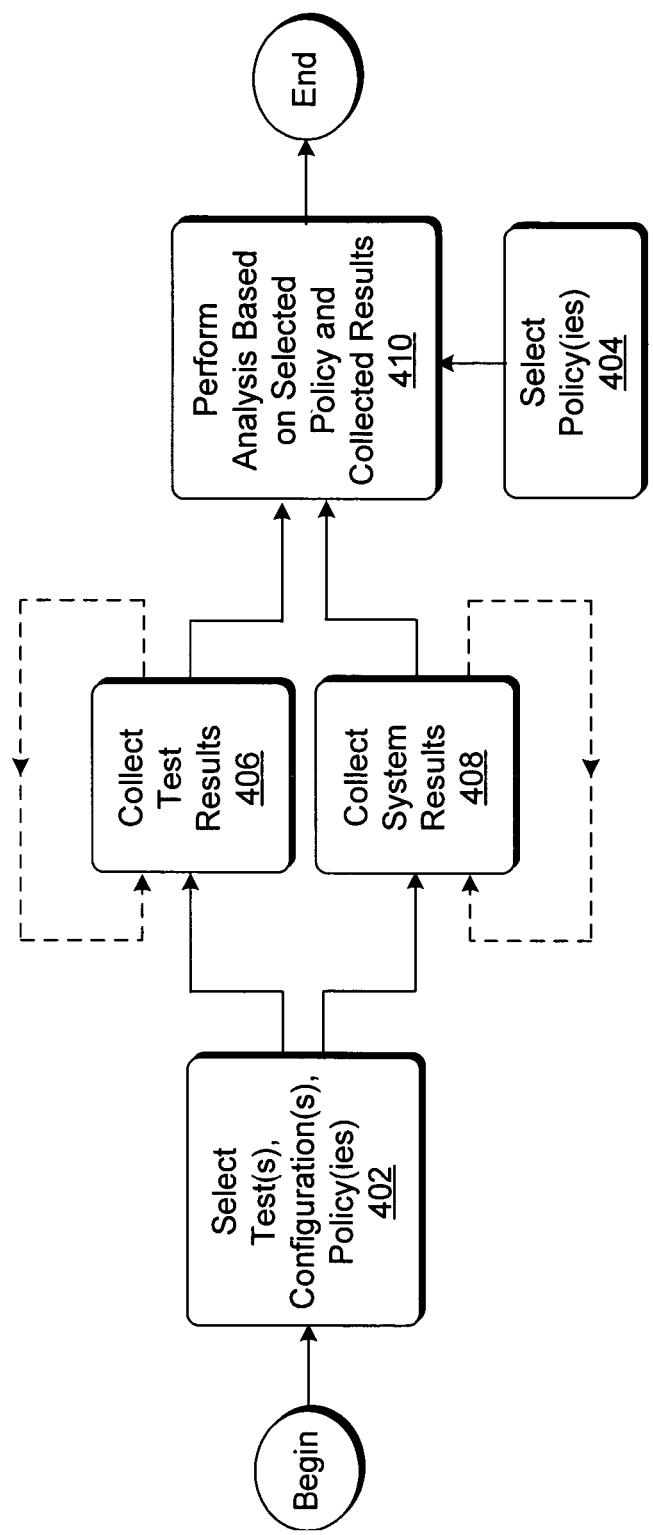
FIG. 4 shows a method for performing testing using the policy-based testing environment shown in FIGS. 2 and 3.

FIG. 4 shows an overview of an exemplary method 400 used to perform tests using the testing environment 200 shown in FIGS. 2 and 3. The method 400 begins in step 402 when the tester 312 selects various tests, configurations, and policies. As mentioned above, in one implementation, the tester 312 can select a test and then itemize the configurations that will be tested in that test. In other cases, the tester simply selects a test which automatically entails the execution of certain configurations. As mentioned, a configuration refers to an execution mode of the software program 204. Exemplary configurations might pertain to the execution of a program in certain selectable views, natural languages, versions, and so on.

As mentioned, the selected policies determine the rules that will be applied to results that are collected from the test and stored in the data store 212. Step 402 shows that the tester 312 can specify the policy(ies) to be applied before the test is conducted. However, step 404 also indicates that the tester 312 can perform the test first, and then subsequently identify the policies that are to be applied to the results stored in the data store 212. This policy selection in step 404 can thus be performed in an "off-line" manner with respect to the actual running of the test.

Steps 406 and 408 pertain to the collection of information during the execution of the test. Namely, step 406 involves collecting actual test results 214 which reflect the output of the test. In many cases, the actual test results 214 can be viewed as expressing a primary indicator of whatever the primary focus of test is. For instance, if the primary focus of the test is to determine whether the software program 204 is producing the correct results, then the actual test results 214 might comprise the actual numerical or textual output of the software program 204. Alternatively, the actual test results 214 may comprise a binary yes/no indication of whether the software program 204 provided prescribed results (that is, whether the test passed or failed). This pass/fail indication can originate from different sources in different testing environments. In one case, the software application program 204 itself may generate this pass/fail information as part of its normal error messaging output. In another case, the operating system or other platform on which the application program 204 runs may generate the pass/fail information. In still another case, the testing logic 208 may perform some preliminary analysis on information extracted from the SUT 202 during the test to provide the pass/fail information. Still other sources of this information are possible.

Step 408 involves collecting actual system results 216. The actual system results 216 pertain to the performance of the software program 204 when implemented on the specific hardware 206 of the SUT 202. The actual system results 216 may include an indication of the execution time required by the SUT 202 to perform certain tasks, the memory utilized in performing the tasks, and so on. If the primary focus of the testing logic 208 is to test the functionality of the SUT 202, then the actual system results 216 can be considered secondary or supplemental information that does not have a direct bearing on the primary focus of the test. If, however, the primary focus of the testing logic 208 is to determine the performance-related behavior of the SUT 202 (regardless of whether it is operating correctly), then the actual system results 216 assume a more primary role in the analysis conducted by the policy analysis system 222 (relative to the actual test results 214).

In one implementation, steps 406 and 408 can be performed in parallel. That is, in this implementation, the collection of system results 216 proceeds in the background as the actual test results 214 are being collected. But it is also possible to perform certain aspects of steps 406 and 408 in series. For instance, if the tester 312 is primarily looking to step 408 to define how much file space that the software program 204 required to store its output, then this determination can be made after the software program 204 has completed its execution.

The dashed lines connected respectively to steps 406 and 408 indicate that steps 406 and 408 can be repeated a plurality of times for different configurations in the test. As an output, steps 406 and 408 result in the storage of actual test results 214 and actual system results 216 in the data store 212.

Step 410 involves performing analysis on the results stored in the data store 212. This analysis entails applying one or more policies 228 to information stored the data store 212 to generate an output verdict. Different policies 228 cull different subsets of information from the data store 212. Further, different policies 228 apply different transformations or mapping strategies to the extracted information to generate the output verdict 230.

In the above method 400, the policies 228 played a role only in interpreting the output results. However, in another implementation, other aspects of the policies 228 can specify the manner in which the test is performed to collect the output results. Indeed, for instance, a policy can be configured which determines whether a test should even be run or not for a given combination of input characteristics.

EXAMPLE

The following discussion presents one example of the application of the above-described testing method 400. This example pertains to the testing of above-described calculator program. The table below shows exemplary input information used to define the test ("Input Characteristics"), and exemplary information generated by the test ("Output Measures").

TABLE 1

| Input Characteristics | | | Output Measures | | | |
| --- | --- | --- | --- | --- | --- | --- |
| Software Version | Locale | CPU Speed | Output Result | CPU Time | Events Logged | Verdict |
| 1.0 | ENU | 300 Mhz | Pass | .501 secs | None | Pass |
| 1.0 | JPN | 300 Mhz | Pass | .555 secs | None | Pass |
| 1.0 | HEB | 300 Mhz | Pass | .534 secs | "warning: x" | FAIL-Known |
| 1.0 | HEB | 300 Mhz | Pass | .535 secs | None | Pass |
| 1.1 | ENU | 300 Mhz | Pass | .410 secs | None | Pass |
| 1.1 | JPN | 300 Mhz | Fail "1" | .455 secs | None | FAIL-Known |
| 1.1 | JPN | 300 Mhz | Pass | .455 secs | None | Pass |
| 1.1 | HEB | 300 Mhz | Pass | .434 secs | None | Pass |

More specifically, the first three columns pertain to input conditions that define the test. The next three columns define various output information generated by the test. And the last column defines the ultimate output verdict 230 generated by the policy analysis system 222.

Referring to the first three columns, the "Software Version" column refers to different versions of the software program 204 used to implement the calculator program. The "Locale" column refers to the natural language in which the calculator program interfaces with its users. The "CPU Speed" refers to the speed at which the CPU is driven while performing the test. Accordingly, different combinations of the first three columns define different input configurations.

In the case of Table 1, the test being performed involves the execution of the test in eight different configurations corresponding to eight different permutations of Software Version, Locale and CPU Speed. This combination of configuration information is merely exemplary. Other programs and testing strategies can use different criteria to define different configurations.

The next three columns define Output Measures generated by the SUT 202. The first column provides the "Output Result." The Output Result corresponds to the actual test results 214 shown in FIG. 2. This Output Result can provide some preliminary indication regarding the high-level outcome of the test. In use, the Output Result may provide some preliminary or contingent analysis that may factor into the ultimate outcome verdict represented in the last column of the table. Presume, for example, that the calculator program is being tested by determining how it behaves when the user attempts to perform a series of computations that involve dividing a number by zero. The preferred response might be to generate a message that informs the user that he or she "cannot divide by zero." A non-preferred response might be to provide any result, or to lock the computer up, "drop" the program, and so on. In this case, an Output Result can be logged as "Pass" to indicate that the program generated at least some output, and "Fail" to indicate that the program failed to provide any kind of output, e.g., as manifested by it dropping the program, or producing some other anomaly. If the program or testing logic 208 is able to determine the cause of the error, such cause may be conveyed using some kind of indicia, such as a numeric code that is associated with an error message.

The "CPU Time" column in the Table 1 represents the amount of time that is required to perform the test for respective configurations. The "Events Logged" column represents any events that may be logged in the course of running the test. Such event logging may represent functionality provided by the software program 204 being tested, other "background" programs used to implement the software program 204 (such as the operating system, various APIs, etc.), or other source of error messages. In the example shown in Table 1, only one of the configurations caused the generation of an event, e.g., "warning: x." Although not shown, the Output Measures could provide memory-related parameters, such as the amount of memory used in the course of the running the software program 204, and so on. Generally, the CPU Time and Events Logged columns represent actual system results 216 collected by the monitoring logic 210.

Finally, the last column provides the output verdict 230 generated by the policy analysis system 222. As previously described, policy analysis logic 224 generates the outcome verdict 230 by selecting various information in the data store 212 and applying various rules to such information as defined by a selected policy. The policies can draw from any of the first through sixth columns, including information pertaining to the Input Characteristics and information pertaining to the Output Measures In the above example, one exemplary policy might apply the following rules:

---

Pass_Verdict ::= Output_Result = "Pass"
FAIL_Known_Verdict ::= Output_Result = "Fail"

This policy states that the ultimate output verdict 230 of the test is simply a repetition of the preliminary analysis captured in the Output Result column (i.e., column four). Accordingly, this policy might be appropriate in the case where the tester 312 is simply interested in determining whether the software program under test is producing the correct output.

Another exemplary policy might apply the following rules:

```
Pass_Verdict ::= CPU_Time < .6 = "Pass"
FAIL_Known_Verdict ::= CPU_Time ≧ .6 = "Fail"
```

This policy states that the ultimate verdict of the test is only a function of the CPU Time column. If the CPU time is less than 0.6 seconds, then the test passes; otherwise, it fails. This policy might be appropriate in the case where the tester is simply interested in whether the software program is running fast enough, irrespective of whether it provides the correct results.

Yet another policy might apply the following rules:

```
Pass_Verdict ::= Output_Result = "PASS"
    AND Events_Logged = none
    AND (CPU_Speed = 300 AND CPU_Time < .6)
FAIL_Known_Verdict ::= Output_Result = "Fail"
    OR Events_Logged = "warning: *"
```

This policy combines various information provided in Table 1, such as the CPU Speed specified in the Input Characteristics columns, the Output Result, and CPU Time. That is, this policy generates a verdict of Pass if: (1) the preliminary functional Output Result indicates Pass; and (2) no events were logged during execution of the program; and (3) the CPU was driven at 300 Mhz; and (4) the time required to execute the program at 300 Mhz was less than 0.6 seconds. On the other hand, this policy generates a Fail verdict if: (1) the preliminary functional Output Result indicates Fail; or (2) there were any warning events logged during the execution of the program.

A great variety of other policies can be devised to address other testing objectives. For instance, some of the policies may entail comparing actual results (214, 216) with associated expected system results (218, 220) to generate output verdicts.

The tester 312 can execute a series of policies at the same time and generate all of the results in one analysis session. Alternatively, the tester 312 can run different policies at different times based on previously collected information in the data store 212, reflecting the tester's different analysis needs at different points in time.

As a final note, the last column of Table 1 shows that the output verdict can include more states than simply pass or fail. Namely, in the case of failure, the testing paradigm can output a state of either "FAIL-Known" or "Fail-Unknown." Generally, a FAIL-Known verdict indicates that the test was able to ascertain the cause of the failure; a FAIL-Unknown verdict indicates that it was not able to discover the source of the error. This is a type of multiple-outcome testing. In the present example, the test can generate a FAIL-Unknown verdict when one or more parameters are missing from the Output Measures collection of information (e.g., when the Output Result parameter and/or the Events Logged parameter is omitted, etc.); it will generate a FAIL-Known verdict otherwise. The three-state verdict (pass, fail known, fail unknown) is merely one example; it is possible to include more than three states, and it is even possible to provide multiple pass states for different levels of assurance associated with a pass verdict.

In addition, the Input Characteristics can include one or more input parameters that are allowed to vary over a range of values or over a collection of input values. This corresponds to a data driven test approach. Accordingly, a single test can actually combine elements of data driven testing, policy-based selection of test verdicts, and multiple outcome testing.

C. Exemplary Computing Environment

Figure 5:
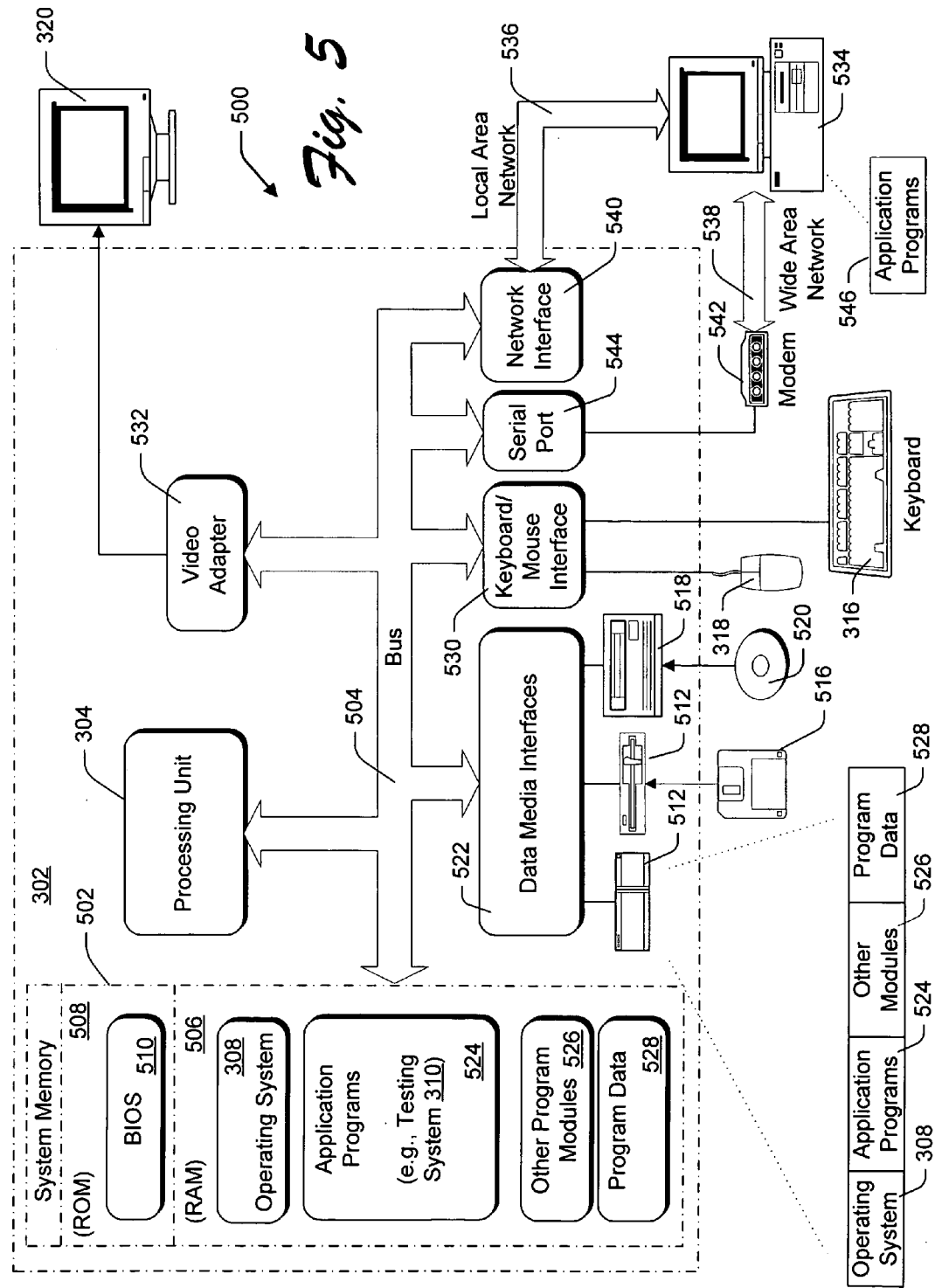
FIG. 5 shows an exemplary computing environment that can be used to implement various features shown in FIGS. 2 and 3.

FIG. 5 provides additional information regarding a computer environment 500 that can be used to implement the solution described in FIGS. 2 and 3. Namely, this computer environment 500 can be used to implement the machine 302 shown in FIG. 3. As mentioned, the machine 302 can constitute a computer device which is separate from the SUT 202, or functionality that is implemented on the SUT 202 itself. In the latter case, the computer environment 500 can also correspond to the SUT 202 being tested. In this case, the computer environment 500 can contain one program that is being tested and another program that is performing the test.

The computing environment 500 includes the general purpose computer 302 and display device 320 discussed in the context of FIG. 3. However, the computing environment 500 can include other kinds of computer and network architectures. For example, although not shown, the computer environment 500 can include hand-held or laptop devices, set top boxes, programmable consumer electronics, mainframe computers, gaming consoles, etc. Further, FIG. 5 shows elements of the computer environment 500 grouped together to facilitate discussion. However, the computing environment 500 can employ a distributed processing configuration. In a distributed computing environment, computing resources can be physically dispersed throughout the environment.

Exemplary computer 302 includes one or more processors or processing units 304, a system memory 502, and a bus 504. The bus 504 connects various system components together. For instance, the bus 504 connects the processor 304 to the system memory 502. The bus 504 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 can also include a variety of computer readable media, including a variety of types of volatile and non-volatile media, each of which can be removable or non-removable. For example, system memory 502 includes computer readable media in the form of volatile memory, such as random access memory (RAM) 506, and non-volatile memory, such as read only memory (ROM) 508. ROM 508 includes an input/output system (BIOS) 510 that contains the basic routines that help to transfer information between elements within computer 302, such as during start-up. RAM 506 typically contains data and/or program modules in a form that can be quickly accessed by processing unit 304.

Other kinds of computer storage media include a hard disk drive 512 for reading from and writing to a non-removable, non-volatile magnetic media, a magnetic disk drive 514 for reading from and writing to a removable, non-volatile magnetic disk 516 (e.g., a "floppy disk"), and an optical disk drive 518 for reading from and/or writing to a removable, non-volatile optical disk 520 such as a CD-ROM, DVD-ROM, or other optical media. The hard disk drive 512, magnetic disk drive 514, and optical disk drive 518 are each connected to the system bus 504 by one or more data media interfaces 522. Alternatively, the hard disk drive 512, magnetic disk drive 514, and optical disk drive 518 can be connected to the system bus 504 by a SCSI interface (not shown), or other coupling mechanism. Although not shown, the computer 302 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 302. For instance, the readable media can store the operating system 308, one or more application programs 524 (such as the testing system 310), other program modules 526, and program data 528.

The computer environment 500 can include a variety of input devices. For instance, the computer environment 500 includes the keyboard 316 and a pointing device 318 (e.g., a "mouse") for entering commands and information into computer 302. The computer environment 500 can include other input devices (not illustrated), such as a microphone, joystick, game pad, satellite dish, serial port, scanner, card reading devices, digital or video camera, etc. Input/output interfaces 530 couple the input devices to the processing unit 304. More generally, input devices can be coupled to the computer 302 through any kind of interface and bus structures, such as a parallel port, serial port, game port, universal serial bus (USB) port, etc.

The computer environment 500 also includes the display device 320. A video adapter 533 couples the display device 320 to the bus 504. In addition to the display device 320, the computer environment 500 can include other output peripheral devices, such as speakers (not shown), a printer (not shown), etc.

Computer 302 can operate in a networked environment using logical connections to one or more remote computers, such as a remote computing device 534. The remote computing device 534 can comprise any kind of computer equipment, including a general purpose personal computer, portable computer, a server, a router, a network computer, a peer device or other common network node, etc. Remote computing device 534 can include all of the features discussed above with respect to computer 302, or some subset thereof.

Any type of network can be used to couple the computer 302 with remote computing device 534, such as a local area network (LAN) 536, or a wide area network (WAN) 538 (such as the Internet). When implemented in a LAN networking environment, the computer 302 connects to local network 536 via a network interface or adapter 540. When implemented in a WAN networking environment, the computer 302 can connect to the WAN 538 via a modem 542 or other connection strategy. The modem 542 can be located internal or external to computer 302, and can be connected to the bus 504 via serial I/O interfaces 544 other appropriate coupling mechanism. Although not illustrated, the computing environment 500 can provide wireless communication functionality for connecting computer 302 with remote computing device 534 (e.g., via modulated radio signals, modulated infrared signals, etc.).

In a networked environment, the computer 302 can draw from program modules stored in a remote memory storage device 546. Generally, the depiction of program modules as discrete blocks in FIG. 5 serves only to facilitate discussion; in actuality, the programs modules can be distributed over the computing environment 500, and this distribution can change in a dynamic fashion as the modules are executed by the processing unit 304.

Wherever physically stored, one or more memory modules 506, 516, 520, 546, etc. can be provided to store the testing system 310. Memory modules 506, 516, 520, and 546 are encompassed by the memory 306 shown in FIG. 3.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for testing a target system, comprising:
   identifying a test to perform on the target system in at least one configuration of the target system;
   applying the test to the target system and collecting plural actual results that characterize the operation of the target system in performing the test; and
   applying a policy to the actual results to generate an output verdict, wherein the policy maps a subset of the actual results to the output verdict using a selected mapping paradigm,
   wherein the collecting of plural actual results comprises:
   collecting at least one function-related actual result that defines whether the target system produces an output that meets a predefined criterion; and
   collecting at least one performance-related actual result that characterizes the performance of the target system while it is executing the test, and
   wherein the policy applied to the actual results maps at least one performance-related actual result into the output verdict.

2. A computer readable medium including machine readable instructions for implementing each of the identifying, applying the test and collecting actual results, and applying the policy as recited in claim 1.

3. An apparatus for testing a target system, comprising means for implementing each of the identifying, applying the test and collecting actual results, and applying the policy as recited in claim 1.

4. A method for testing a target system, comprising:
   identifying a test to perform on the target system in at least one configuration of the target system;
   applying the test to the target system and collecting plural actual results that characterize the operation of the target system in performing the test; and
   applying a policy to the actual results to generate an output verdict, wherein the policy maps a subset of the actual results to the output verdict using a selected mapping paradigm,
   wherein the collecting of plural actual results comprises:
   collecting at least one function-related actual result that defines whether the target system produces an output that meets a predefined criterion; and collecting at least one performance-related actual result that characterizes the performance of the target system while it is executing the test, and wherein the policy applied to the actual results maps a combination of at least one function-related actual result and at least one performance-related actual result into the output verdict.

5. A computer readable medium including machine readable instructions for implementing each of the identifying, applying the test and collecting actual results, and applying the policy as recited in claim 4.

6. An apparatus for testing a target system, comprising means for implementing each of the identifying, applying the test and collecting actual results, and applying the policy as recited in claim 4.

7. An apparatus for testing a target system, comprising:
testing logic configured to apply a test to the target system in at least one configuration of the target system to generate at least one actual result;
monitoring logic configured to make at least one measurement of the target system associated with its performance of the test to provide at least one other actual result;
a data store for storing the actual results generated by the testing logic and the monitoring logic; and
policy analysis logic configured to apply a policy to actual results stored in the data store to generate an output verdict, wherein the policy maps a subset of the actual results to the output verdict using a selected mapping paradigm,
wherein said at least one actual result generated by the testing logic is a function-related actual result that defines whether the target system produces an output that meets a predefined criterion,
wherein said at least one other actual result generated by the monitoring logic is a performance-related actual result that characterizes the performance of the target system while it is executing the test, and
wherein the policy applied to the actual results maps at least one performance-related actual result into the output verdict.

8. A computer readable medium including machine readable instructions for implementing each of the logic recited in claim 7.

9. An apparatus for testing a target system, comprising:
testing logic configured to apply a test to the target system in at least one configuration of the target system to generate at least one actual result;
monitoring logic configured to make at least one measurement of the target system associated with its performance of the test to provide at least one other actual result;
a data store for storing the actual results generated by the testing logic and the monitoring logic; and
policy analysis logic configured to apply a policy to actual results stored in the data store to generate an output verdict, wherein the policy maps a subset of the actual results to the output verdict using a selected mapping paradigm.
wherein said at least one actual result generated by the testing logic is a function-related actual result that defines whether the target system produces an output that meets a predefined criterion,
wherein said at least one other actual result generated by the monitoring logic is a performance-related actual result that characterizes the performance of the target system while it is executing the test, and
wherein the policy applied to the actual results maps a combination of at least one function-related actual result and at least one performance-related actual result into the output verdict.

10. A computer readable medium including machine readable instructions for implementing each of the logic recited in claim 9.

* * * * *

UNITED STATES PATENT AND TRADEMARK OFFICE
CERTIFICATE OF CORRECTION

PATENT NO. : 7,043,400 B2 Page 1 of 1
APPLICATION NO. : 10/705005
DATED : May 9, 2006
INVENTOR(S) : Keith B. Stobie et al.

It is certified that error appears in the above-identified patent and that said Letters Patent is hereby corrected as shown below:

On the title page, item (56), under "Other Publications", in column 2, line 16, delete "ww." and insert -- www. --, therefor.

On the title page, item (57), in "Abstract", in column 2, line 1, delete "apply" and insert -- applying --, therefor.

In column 16, line 21, in Claim 9, after "paradigm" delete "." and insert -- , --, therefor.

Signed and Sealed this

Twenty-third Day of March, 2010

David J. Kappos
*Director of the United States Patent and Trademark Office*